Jan. 16, 1962 — J. R. BARNARD — 3,017,140
PROPULSION AND LIFTING SURFACE SYSTEM FOR AERIAL VEHICLES
Filed March 27, 1959 — 3 Sheets-Sheet 1

John R. Barnard,
INVENTOR

BY

ATTORNEYS

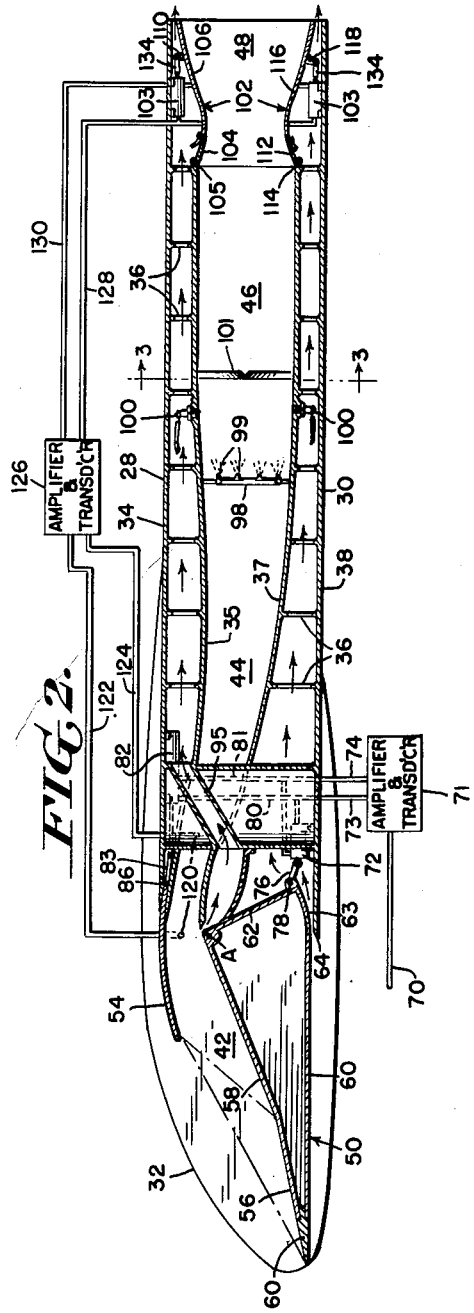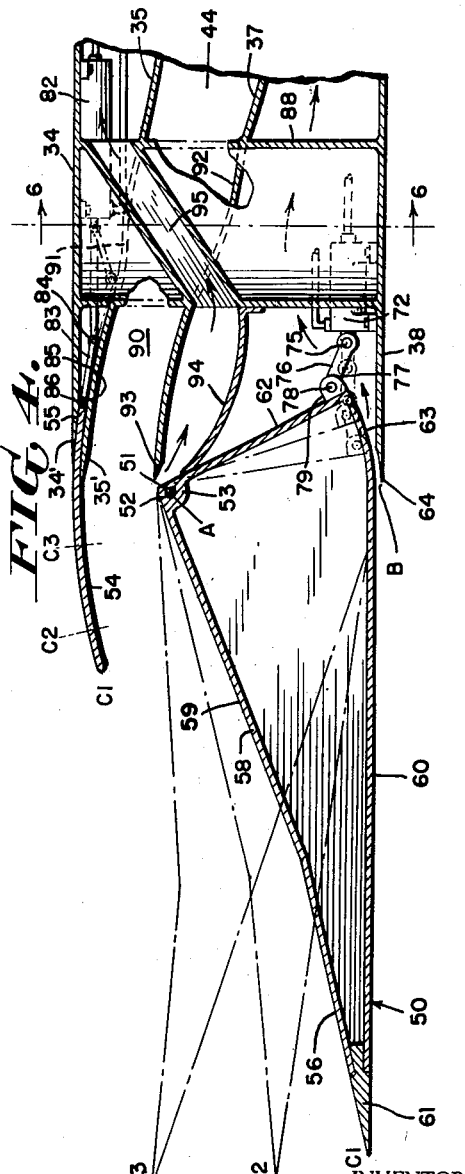

Jan. 16, 1962   J. R. BARNARD   3,017,140
PROPULSION AND LIFTING SURFACE SYSTEM
FOR AERIAL VEHICLES
Filed March 27, 1959   3 Sheets-Sheet 3

John R. Barnard,
INVENTOR

BY

ATTORNEYS

United States Patent Office 3,017,140
Patented Jan. 16, 1962

3,017,140
PROPULSION AND LIFTING SURFACE SYSTEM FOR AERIAL VEHICLES
John R. Barnard, Mishawaka, Ind. (MABS–11, MAG–11, % Fleet Post Office, San Francisco, Calif.)
Filed Mar. 27, 1959, Ser. No. 802,583
8 Claims. (Cl. 244—15)
(Granted under Title 35, U.S. Code (1952), sec. 266)

The invention described herein may be manufactured and used by or for the Government of the United States of America for governmental purposes without the payment of any royalties thereon or therefor.

The present invention relates to aerial vehicles adapted for operation over a wide range of supersonic velocities. Specifically it relates to an aerial vehicle in which a ramjet engine is combined with the lifting or aerodynamic surface in such a manner as to provide a vehicle which is more capable of meeting present day performance requirements than any such vehicle heretofore known.

To obtain the high speeds and great maneuverability required of present day aircraft and missiles makes necessary a vehicle having low aerodynamic drag, high lift capability and an efficient propulsion system if weight and cost of manufacturing are to be kept within reason. Particularly in the case of military aircraft and missiles, increased structural strength and power are required because of the maneuvering factors introduced by the necessity of reaching a target, except in cases where detection and guidance equipment permit setting a course to avoid such high maneuver loads.

It has been previously proposed to split or duct the airfoils of an aircraft, and, for propulsion, to provide a conventional ramjet engine in the resulting space. Thus, the ramjet engine and airfoil combination previously proposed includes a split wing in which a diffuser, combustion chamber, and exhaust nozzle are arranged in the usual configuration, with some special structural and functional features being introduced to provide certain generally desirable characteristics relating to lift, drag, structural strength, and functioning of components of the ramjet engine itself.

The present invention relates to a closely integrated combination of an airfoil and a novel ramjet engine which has the advantages of increased wing thickness and strength, lower drag, as well as greatly improved ramjet engine performance. According to the present invention a thin airfoil of an aerial vehicle is split or ducted and a ramjet engine placed in the wing permitting the wing to be thickened and strengthened without adding high drag losses. The engine intake duct or diffuser occupies the front portion including the leading edge of the wing, while the burner and the exhaust nozzle occupy the central portion, and the rear portion near the trailing edge, respectively. Suitable fuel tanks are located in the fuselage or main body of the vehicle.

The ramjet engine of the present invention includes the essential components of such an engine, i.e., a diffuser for accepting and slowing down the high velocity, low pressure air and converting it to high pressure, low velocity air, means for mixing fuel with the high pressure air, ignition means, a flame-holder system for facilitating combustion of the mixture, and a nozzle through which the gases of combustion are exhausted to provide forward thrust.

However, in contra-distinction to prior devices of this type, the present invention includes an engine of variable configuration which permits efficient operation over a wide range of supersonic speeds. The diffuser section is best described as comprising a supersonic diffuser section of variable configuration and constructed so as to provide external as well as internal compression. This diffuser section comprises a movable shock wave generator attached to one section of the ducted wing at the leading edge thereof which cooperates with a movable compression lip suitably positioned on the other section of the wing structure. The diffuser configuration is varied in response to a Mach number setting device to vary the capture area with respect to a constant throat area at the entrance to the subsonic diffuser thereby permitting easy starting of the engine and operation at peak efficiency. An advantage in the form of increased lift may also be obtained from this configuration of the diffuser.

Another feature of the engine of the present invention is that the inlet cross-sectional area at the diffuser throat is constant with choked flow being maintained by varying the exhaust nozzle by means of a device for sensing the position of the normal shock in the diffuser throat. In addition, the burner cross-sectional area is constant and the air is admitted at a constant Mach number. These design conditions permit the subsonic diffuser of the present engine to realize peak efficiency and with these conditions existing at the burner, the design of the latter can also be optimized for peak engine efficiency.

Accordingly, it is a primary object of the invention to provide an aerial vehicle capable of efficient operation over a wide range of supersonic speeds.

Another object of the invention is the provision of an aerial vehicle having the advantages of high design point performance while permitting efficient operation over a wide Mach number range.

A further object of the invention is the provision of an aerial vehicle having increased thrust to drag ratio per pound of payload, increased maneuver load capabilities with no weight penalty, and decreased thrust specific fuel consumption for a specific mission and payload.

Another object of the invention is the provision in an aerial vehicle of an integrated ramjet power plant and lifting surface characterized by low drag, great structural strength, increased lift capability, sufficient thrust to propel the vehicle over a wide range of supersonic Mach numbers and altitudes, and high maneuverability.

An additional object of the invention is the provision of an improved combination of ramjet engine and lifting surface, the ramjet engine having a variable configuration providing efficient operation of the engine at high speeds which at the same time may enhance the lift capabilities of the plane.

Many of the attendant advantages of this invention will be readily appreciated as the same becomes better understood by reference to the following detailed description when considered in connection with the accompanying drawings wherein:

FIG. 2 is a somewhat diagrammatic sectional view of the combined wing and propulsion system of the present invention;

FIG. 4 is an enlarged sectional view with parts broken away, of the inlet portion of the diffuser, three positions of the shock generator being shown;

Figure 1:
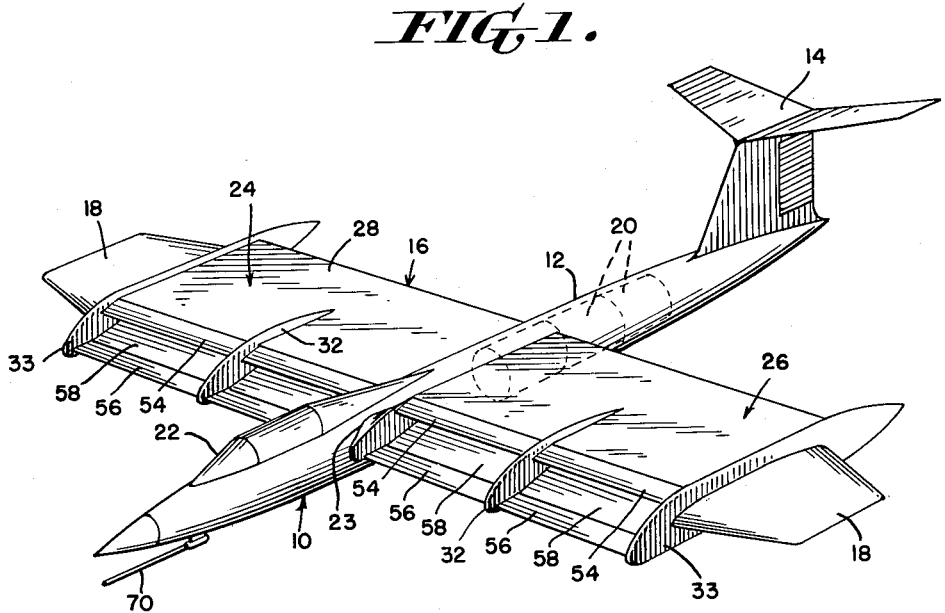
FIG. 1 is a perspective view of an aerial vehicle embodying the present invention.

Referring now to FIG. 1, reference numeral 10 designates an aerial vehicle in its entirety, comprising generally a fuselage 12, an empennage 14, and a wing 16 secured to the fuselage. The wing 16 is the primary airfoil or sustaining means of the vehicle and also houses the ramjet engine of the present invention. Flippers or control surfaces 18 may be provided at the tips of wing 16. Suitable fuel tanks 20 are arranged centrally of the fuselage 12 and, in the case of the application of the invention to manual aircraft, a cockpit 22 is located in the forward portion of the fuselage. A Mach number sensing device 70 is shown on the underside of the fuselage near the nose of the vehicle. Scoops 23 for the removal of boundary layer air are provided near the sections of the fuselage 12 to which the wing 16 is attached.

Wing 16 actually comprises starboard and port sections 24 and 26, respectively, only one of which will be described in detail as these sections are identical. The starboard wing section 24 comprises an upper panel 28 and a lower panel 30 firmly held apart in suitable spaced relationship by ribs 32 and a wing tip or end cap 33. The details of construction of the upper and lower wing panels 28 and 30 do not form a part of this invention, it being important only that they possess the requisite dimensions and structural strength. As shown in FIG. 2, panel 28 may comprise a relatively flat upper member 34 of sheet material and a suitably curved lower member 35 held together by a suitable number of vertical elements 36 to which said members may be welded. Similarly, panel 30 may comprise a suitably curved upper member 37 and a relatively flat lower member 38 also held together by a number of vertical elements 36.

The wing section 24 houses a ramjet engine comprising a supersonic diffuser section 42, a subsonic diffuser section 44, a burner or combustion chamber 46, and an exhaust nozzle 48. The supersonic diffuser 42 is of variable inlet or capture configuration and comprises a movable shock generator 50 mounted adjacent to the forward portion of lower panel 30 and rotatable about point A. The shock generator 50 may be rotatably mounted on a rod 51 received in an aperture 52 in a slightly enlarged portion 53 provided at a point at which two surfaces of the shock generator are joined, rod 51 being attached at its ends to a rib 32 and end cap 33 or to rib 32 and the fuselage 12. The movable shock generator 50 cooperates with a movable curved compression lip 54 which is slidably carried in a suitable slot 55 formed by the tapered forward edges 34' and 35' of upper and lower surfaces 34 and 35 of panel 28.

The movable shock generator 50 is generally triangular in cross-section; however, a plurality of wedges 56 and 58 (two in the example shown) are formed on one of its surfaces. The upper surface 59 and lower surface 60 of shock generator 50 are joined at their forwardmost edges by a thickened triangular reinforcing member 61 of suitable size to withstand deformation under most flight conditions. The rear edges of the upper and lower surfaces 59 and 60 respectively are interconnected by sheet metal member 62, the joint with the rear edge of upper surface 59 being enlarged to accommodate aperture 52 as aforesaid. The lower surface 60 has a curved portion 63 adjacent to its rear edge to permit partial retraction of the movable shock generator 50 into the interior of lower wing panel 30 in the vicinity of the forward edge 64 of the lower wing surface 38 as the shock generator is rotated downwardly.

The movable compression lip 54 and the movable shock generator 50 cooperate to provide a unique intake configuration for any desired speed of the aircraft. For this purpose a Mach number sensing device 70, which may be a Pitot tube or similar device is shown schematically. Any convenient system may be employed for positioning the shock generator 50 and the compression lip 54 as a function of the output of the Mach number sensing device 70. In the present embodiment a system is shown which comprises an amplifier and transducer 71 connected to the Pitot tube 70 for converting the output of the sensing device to hydraulic pressure at a level suitable for actuating hydraulic motor 72. The output of amplifier and transducer 71 acts on hydraulic fluid in feed line 73 to position a piston slidably mounted in motor 72. A suitable return line 74 is provided for the hydraulic fluid. The piston of hydraulic motor 72 is connected to one end 75 of mechanical link 76 which is connected at its other end 77 to shock generator 50 by means of a pin 78 inserted in suitable apertures provided in link 76 and a lug 79 formed on the shock generator.

Extensions 80 and 81 are provided on hydraulic lines 73 and 74, respectively, to accommodate the fluid for actuating a hydraulic motor 82 which moves compression lip 54 to a position corresponding to that assumed by shock generator 50 as a function of the output of Pitot tube 70. A mechanical link 83 has one end 84 connected to the piston of hydraulic motor 82 and its other end 85 connected to compression lip 54 by means of a pin 86 inserted in suitable apertures provided in said pin and said link. Under the action of the hydraulic motor 82 compression lip 54 moved into and out of slot 55 formed at the leading edge of upper wing panel 28. Complementary positions C1, C2, and C3 of the shock generator 50 and the movable compression lip 54 are shown in solid and dot and dash lines in FIG. 4.

Figure 7:
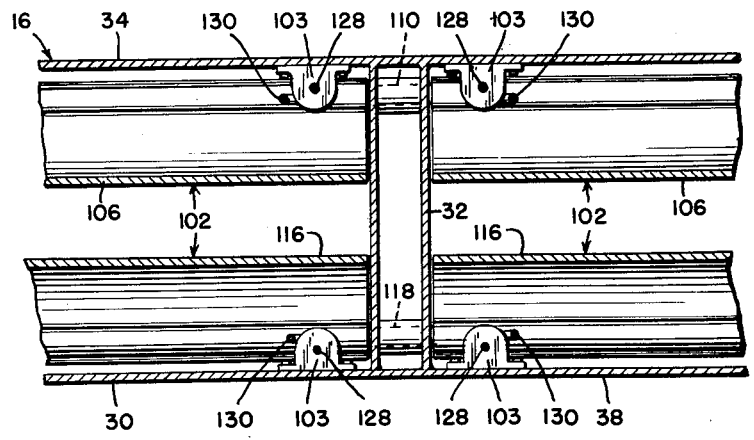
FIG. 7 is an enlarged fragmentary sectional view along line 7—7 of FIG. 5.

To provide the requisite structural strength, hollow vertically extending structural members or spar posts 88 are provided near the forward edge of the wing in spaced relationship adjacent to one of the ribs 32, as well as to said ribs and end caps 33. As can be seen in FIG. 4, the spar post 88 is attached to upper surface member 34 and to lower surface member 38 by welding and extends through the engine throat 90. To compensate for the presence of the post and to maintain the cross-sectional area of the throat 90 constant, the lower surface member 35 of panel 28 is curved upwardly at 91 and the upper surface member 37 of panel 30 is curved downwardly at 92. Similar rear spar posts, one of which is shown in FIG. 7, are correspondingly located adjacent the trailing edge of the wing to complete the box-like wing structure. Compensation is similarly made for the presence of the rear spar posts to maintain cross-sectional area in the vicinity of the exhaust nozzle constant.

Figure 6:
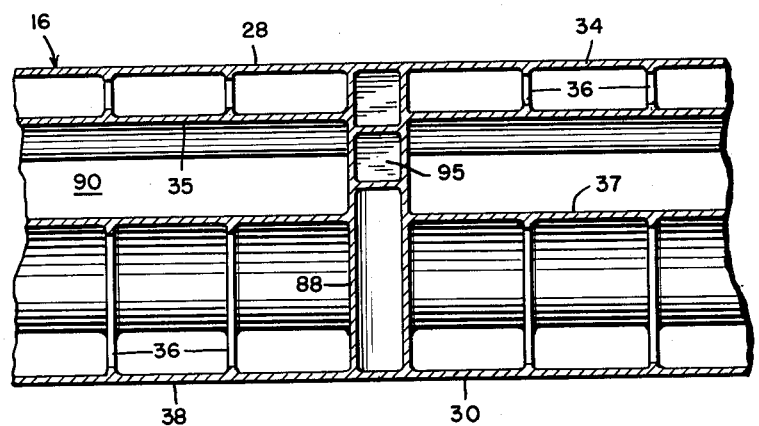
FIG. 6 is an enlarged fragmentary sectional view along line 6—6 of FIG. 4.

A boundary layer bleed 93 is provided in the vicinity of point A and, as shown by the arrows, boundary layer air flows through a channel formed by the forwardmost part of upper surface 37 and a curved sheet metal member 94 attached to the front of forward spar post 88 into passageway 95 in spar post 88 (see FIG. 6) and then into the interior of wing panel 28 to cool that side of the engine and wing. Boundary layer air is also bled from the vicinity of point B and as shown by the arrows flows around the spar post 88 and into the space inside wing panel 30 to cool that side of the engine and wing. After cooling the engine, the boundary layer air may be permitted to leak into the main stream of air or gases through suitable apertures in the vicinity of the exhaust nozzle 48.

The movable shock generator 50 and the movable compression lip 54 cooperate to provide a unique diffuser intake configuration for any speed. The shock generator 50 preferably possesses a cross-section similar to the cross-section of the Oswatitch type diffuser. The particular diffuser shown is formed of multiple wedges to provide external compression as distinguished from a continuously curved profile which could also be used for this purpose. The diffuser is designed to produce two-dimensional supersonic external compression at a value above Mach 1. In the configuration shown, two oblique shocks are formed and attached to the forward edge of the compression lip 54. This is followed by nearly isentropic internal compression to Mach 1 by means of an isentropic compression fan prior to entry into the constant area throat 90 of the diffuser and suitable expansion in the subsonic diffuser 44 to permit continuous combustion. The normal shock will be present at the forward part of the lip at the entrance to the internal supersonic "isentropic" diffuser when the engine is not producing thrust. When the engine is started, the normal shock will be swallowed and then will be forced up to the throat by the action of the variable area exhaust nozzle 48 that will be described later. The fact that the inlet or capture area is variable with speed permits easy starting of the engine and allows the engine to operate at peak efficiency since the ratio of the capture area to the constant throat area can be changed from that required for swallowing to that required for peak efficiency.

Choked flow is maintained in the subsonic diffuser 44 when the normal shock is maintained in the constant area throat 90. Subsonic expansion of the air takes place in the diffuser 44 and fuel is injected into the air near the exit portion of the diffuser by means of a suitable injection system indicated generally at 98. While no details of the fuel injection system are shown it is to be assumed, of course, that suitable piping is connected at one end to the fuel tank and is arranged in such a manner as to present no substantial obstacle to the flow of the air through the engine. An appropriate number of openings or nozzles 99 will be provided in that part of the piping comprising the injection system 98 that is in the air stream to insure the thorough mixing of the air and fuel. The rate of fuel flow will, of course, be controlled by the pilot or a remote command system. For igniting the mixture, spark plugs 100 are suitably mounted downstream from the injection system 98.

Figure 3:
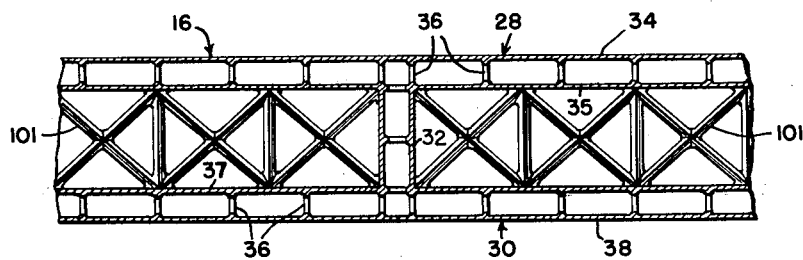
FIG. 3 is a sectional view taken along line 3—3 of FIG. 2 and showing the details of the flameholders of the present invention.

Flameholders 101 are positioned adjacent the entrance portion of the combustion chamber 46. The combustion chamber is of constant cross-sectional area, and because of the constant area throat 90 and the action of the variable area exhaust 48 in maintaining choked flow condition, the flow of air to the burner will be at constant Mach number allowing simplification of burner design as well as its optimization for peak efficiency. As best seen in FIGS. 2 and 3, the flameholders 101 are channel-shaped and may be criss-crossed and welded to each other and to the upper and lower wing panels 28 and 30 in such a manner as to greatly increase the structural strength of the wing section 16.

Figure 5:
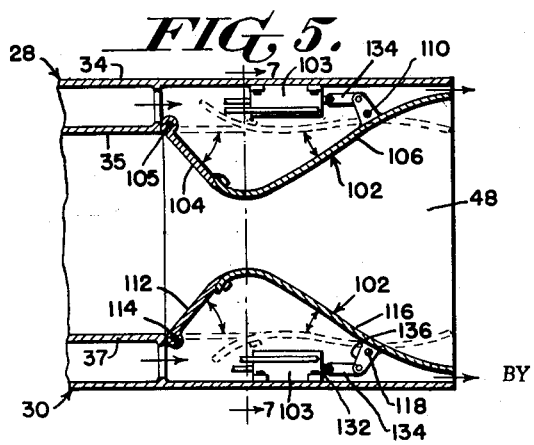
FIG. 5 is an enlarged sectional view of the exhaust nozzle of the present engine.

A two-dimensional variable exhaust nozzle 48 is provided. The nozzle is of convergent-divergent type and is shown in FIGS. 2 and 5 in the form of upper and lower sets 102 of over-lapping plates, each set of plates being actuated by a hydraulic motor 103 to vary the exit area of nozzle 48. The upper set of plates comprises plate 104 connected by a hinge 105 to the rear edge of lower member 35 of panel 28 and arranged to partially overlap curved plate 106 pivotally supported by a hinge 110 which is attached at its ends to vertical members of the wing structure, for example, ribs 32 and end caps 33. Similarly the lower set of plates comprises plate 112 connected by a hinge 114 to the rear edge of upper member 37 of panel 30 and arranged to partially overlap curved plate 116 pivotally supported by a hinge 118 which is attached at its ends to vertical members of the wing structure, for example, ribs 32 and end caps 33. The plates are held on overlapping relation against the action of the hydraulic motors 103 by the pressure of the exhaust gases. It will be understood that the curvature of the plates of each set is such as to provide smooth contact.

A mechanical linkage interconnects the hydraulic motors with the rear-most plate of each set for moving the plates against the action of the exhaust gases. As these linkages are the same for both sets of plates only one will be described in detail. Referring to the lower one of motors 103 an extension 132 provided on the motor shaft has its outer end pivotally connected to one end of a link 134 which link is in turn pivotally connected at its other end to lug 136 on plate 116.

The hydraulic motors 103 are actuated by a device for detecting the position of the normal shock in the throat area 90 which comprises a pair of bleed holes 120 provided in the engine wall in the vicinity of the throat. Air from adjacent bleed holes 120 under relative pressure determined by the position of normal shock is led through lines 122 and 124 to an amplifier and transducer 126 for converting the pressure differential existing in lines 122 and 124 to hydraulic pressure at a suitable level for actuating hydraulic motors 103. The output of amplifier and transducer 126 acts on hydraulic fluid in feed line 128 to position the pistons slidably mounted in motors 103. A suitable return line 130 is provided for the hydraulic fluid.

It will be understood that a single sensing means could be employed to control both the configurations of both variable inlet diffuser and the variable exhaust nozzle. In that event either the Pitot tube or a similar type of speed sensing device could be employed, after an appropriate calibration, to operate a suitable hydraulic system for actuating both the movable shock generator 50 and the cooperating compression lip 54, as well as the variable exhaust nozzle 48. Also a device for sensing the position of the normal shock in the diffuser throat could be employed to control the configurations of the intake diffuser and the exhaust nozzle.

It is believed that the operation of my invention will be evident from the preceding description. The shape of the movable shock generator at the leading edge is either made up of a series of wedges as shown or with secondary wedge angles faired-in to form an isentropic fan for external compression. This is combined with a coupled simple and feasible means of obtaining optimum internal compression while still permitting easy "shock swallowing" or starting without overspeeding. The use of the generated shock system for diffusion provides high total pressure recoveries over a wide range of supersonic operating speeds and superior total pressure recovery at design speed, while permitting the retention of a constant diffuser throat area and Mach number for optimum subsonic diffusion over the entire operating range. Increased wing strength and minimization of aeroelastic effects with no weight penalty are by-products of the close integration of wing and engine.

The use of the movable shock generator also provides an advantage in terms of lift. It was found that for best total pressure recovery when operating below design speed, the shock generator must be rotated up. This rotation places the outer surface of the shock generator at some angle to the relative wind. The lift produced by this deflection of the air stream provides the lift required for level flight at moderate altitudes while total pressure recovery of the inlet air is at or near maximum.

While certain preferred embodiments of the invention have been specifically disclosed, it is understood that the invention is not limited thereto as many variations will be readily apparent to those interpretations within the terms of the following claims.

What I claim is:

1. In an aerial vehicle, aerodynamic sustaining and propulsion means operatively associated with said vehicle, said means comprising, a ducted airfoil, said ducted airfoil including panel members arranged in spaced superposed relationship, and a variable configuration ramjet engine integral with said ducted airfoil, said ramjet engine including a pivotable shock generator attached to the forward edge of one of said panels and a longitudinally slidable lip attached to the other of said panels, said lip and said generator being positioned in response to the speed of said vehicle to vary the intake of said engine, combustion means located between said panels, and variable exhaust means between panels rearward of said combustion means.

2. An aerial vehicle as recited in claim 1, wherein the movable shock generator is wedge shaped and may be positioned to provide lift augmentation for said vehicle.

3. In an aerial vehicle, aerodynamic sustaining and propulsion means operatively associated with said vehicle, said means comprising a ducted airfoil, said ducted airfoil including upper and lower panel members arranged in spaced relationship, and a variable configuration ramjet engine integral with said ducted airfoil, said ramjet engine including a supersonic diffuser comprising a movable wedge-shaped shock generator attached to the forward edge of said lower panel, a lip slidably carried on forward edge of the upper panel, speed sensing means for controlling the relative positions of the shock generator and the lip to vary the engine air intake configuration, a throat of constant cross-sectional area provided rearward of said supersonic diffuser, means forming a combustion chamber rearward of said throat, an exhaust nozzle of variable cross-sectional area, and means for determining the position of the shock wave in said intake throat and varying said area of said nozzle in accordance therewith.

4. In an aerial vehicle, as claimed in claim 3 and means for bleeding air from the boundary layer formed in the vicinity of said movable shock generator and passing said air into the interior of the upper and lower panels of said ducted airfoil for cooling the engine.

5. Integrated aerodynamic sustaining and propulsion means for an aerial vehicle comprising, an airfoil having spaced upper and lower panel members, said panel members defining therebetween a duct, a supersonic diffuser comprising a compression lip slidably mounted at the upper leading edge of said duct for extending or retracting said leading edge, and a shock wave generator pivotally mounted at the lower leading edge of said duct for varying the size of the throat of said supersonic diffuser and for varying the angle of the shock wave produced by said shock wave generator, forward speed controlled power means for moving said compression lip and said shock wave generator in accordance with said forward speed, the forward portion of said duct comprising a subsonic diffuser, the intermediate portion comprising a combustion section, and the rear portion comprising a variable exhaust nozzle section, and second power means for varying the size of said exhaust nozzle section in accordance with pressures developed in said subsonic diffuser.

6. Integrated aerodynamic sustaining and propulsion means for an aerial vehicle comprising, an airfoil, spaced parallel upper and lower panel members forming the outer surfaces of said airfoil and having an interior configuration to form a plurality of ducts horizontally spaced with respect to each other in said airfoil, each of said ducts having an intake at the leading edge of said airfoil and an exhaust at the trailing edge thereof, power means for varying the angle of attack of each of said intakes in accordance with forward speed of the aerial vehicle, and second power means for varying the area of said exhausts in accordance with pressures developed in said ducts, each of said ducts comprising subsonic diffusers and combustion chambers, each of said combustion chambers having mounted therein fuel injection means, ignition means and flame holding means.

7. The integrated aerodynamic sustaining and propulsion means for an aerial vehicle of claim 5 wherein said shock wave generator includes a plurality of shock producing surfaces.

8. In an aerial vehicle, combined aerodynamic sustaining and propulsion apparatus operatively associated with said vehicle, said apparatus comprising a ducted airfoil including upper and lower panel members, said upper and lower panel members forming the casing of a ramjet engine as an integral portion of said airfoil each of said panel members having spaced surfaces to provide for circulation of air around said engine, reinforcing ribs mounted between said surfaces to maintain said spacing and to provide rigidity to said airfoil, said ribs being perforated to permit said circulation of air, said engine casing containing variable diffusing means, expansion means and combustion means, said variable diffusing means including a pivoted shock wave generator mounted adjacent the leading edge of said lower panel and a sliding lip mounted in the leading edge of said upper panel, said shock wave generator being wedge-shaped, the apex thereof being the leading edge and the upper face comprising two slightly inverse angles forming the shock producing surfaces, power means for moving said variable diffusing means in accordance with the forward speed of the vehicle, variable exhaust means, and power means for moving said variable exhaust means in accordance with pressures developed in the engine.

References Cited in the file of this patent

UNITED STATES PATENTS

| | | |
|---|---|---|
| 1,725,914 | Hallowell | Aug. 27, 1929 |
| 2,836,379 | Salmon | May 27, 1958 |
| 2,877,965 | Wakefield | Mar. 17, 1959 |

OTHER REFERENCES

SAE Journal, vol. 66, No. 8. Aug., 1958, page 32.